United States Patent
Toba et al.

(10) Patent No.: US 10,020,681 B2
(45) Date of Patent: Jul. 10, 2018

(54) POWER TRANSMITTING COMMUNICATION UNIT

(71) Applicant: Yazaki Corporation, Tokyo (JP)

(72) Inventors: Tatsuo Toba, Kanagawa (JP); Kyoko Furuhashi, Kanagawa (JP); Kenji Matsushita, Kanagawa (JP); Yuta Nakagawa, Kanagawa (JP); Shingo Tanaka, Kanagawa (JP); Yoichi Ido, Kanagawa (JP); Noritaka Taguchi, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 77 days.

(21) Appl. No.: 15/240,010

(22) Filed: Aug. 18, 2016

(65) Prior Publication Data
US 2017/0054326 A1   Feb. 23, 2017

(30) Foreign Application Priority Data

Aug. 21, 2015 (JP) .................................. 2015-163740
Jul. 1, 2016 (JP) .................................. 2016-131662

(51) Int. Cl.
*H02J 50/10* (2016.01)
*H02J 50/80* (2016.01)
*H04B 5/00* (2006.01)
*H02J 50/70* (2016.01)
*H01F 38/14* (2006.01)

(52) U.S. Cl.
CPC .............. *H02J 50/10* (2016.02); *H02J 50/70* (2016.02); *H02J 50/80* (2016.02); *H04B 5/0012* (2013.01); *H01F 38/14* (2013.01)

(58) Field of Classification Search
CPC . H02J 5/005; H02J 7/025; H02J 17/00; H04B 5/0025–5/0093; B60L 11/182; H01F 38/14
See application file for complete search history.

(56) References Cited

U.S. PATENT DOCUMENTS

| 2008/0076351 A1* | 3/2008 | Washiro | ............... H04B 5/0031 455/41.1 |
| 2009/0121949 A1* | 5/2009 | Washiro | ................... H01Q 7/00 343/702 |
| 2010/0270867 A1* | 10/2010 | Abe | ........................ H02J 7/025 307/104 |

(Continued)

FOREIGN PATENT DOCUMENTS

| JP | 2014-49479 A | 3/2014 | |
| JP | WO 2014156145 A1 * | 10/2014 | ............... H02J 5/005 |

*Primary Examiner* — Rexford Barnie
*Assistant Examiner* — David Shiao
(74) *Attorney, Agent, or Firm* — Kenealy Vaidya LLP

(57) ABSTRACT

A coupling electrode of a communication coupler is installed at an opening of a substrate and is, viewed from an orthogonal direction orthogonal to a coil axial direction of a power transmission coil, positioned to the substrate side in the coil axial direction than a coil end portion of the power transmission coil opposite side to the substrate. For example, an end portion of the coupling electrode on a communication side in the coil axial direction positions, viewed from the orthogonal direction, at the same position as a surface of the substrate opposite to the power transmission coil, in the coil axial direction.

4 Claims, 6 Drawing Sheets

(56) References Cited

U.S. PATENT DOCUMENTS

| | | | | |
|---|---|---|---|---|
| 2012/0146580 A1* | 6/2012 | Kitamura | ............... | H01F 38/14 |
| | | | | 320/108 |
| 2012/0325915 A1* | 12/2012 | Kato | ................... | H01Q 1/2225 |
| | | | | 235/492 |
| 2012/0326520 A1* | 12/2012 | Konya | ................ | H04B 5/0031 |
| | | | | 307/104 |
| 2016/0043565 A1* | 2/2016 | Asaoka | .................. | H02J 5/005 |
| | | | | 307/104 |

* cited by examiner

POWER TRANSMITTING COMMUNICATION UNIT

CROSS-REFERENCE TO RELATED APPLICATION(S)

The present application claims priority to and incorporates by reference the entire contents of Japanese Patent Application No. 2015-163740 filed in Japan on Aug. 21, 2015 and Japanese Patent Application No. 2016-131662 filed in Japan on Jul. 1, 2016.

BACKGROUND OF THE INVENTION

1. Field of the Invention

The present invention relates to a power transmitting communication unit.

2. Description of the Related Art

Conventionally, there has been a power transmitting communication unit provided with a function to perform the transmission of electric power in a non-contact manner, and a function to perform communication in a wireless manner. The power transmitting communication unit is provided with, on the same substrate, a communication module, and a power transmission coil that is spirally formed around the communication module (for example, Japanese Patent Application Laid-open No. 2014-049479).

The communication module, however, is susceptible to a magnetic field of the power transmission coil, and there has been a problem in that the temperature of the communication module rises by eddy currents.

SUMMARY OF THE INVENTION

The present invention has been made in view of the above-mentioned circumstances, and an object of the invention is to provide a power transmitting communication unit that can suppress the temperature rise in the communication module.

In order to achieve the above mentioned object, a power transmitting communication unit according to one aspect of the present invention includes a substrate that has an opening; a power transmission coil that is spirally formed around the opening, is mounted on one surface of the substrate, is connected to a circuit of the substrate, and performs transmission of electric power in a non-contact manner; and a communication module that is installed at the opening, includes a conductive member, and performs wireless communication through the conductive member, wherein when viewed from an orthogonal direction orthogonal to a coil axial direction of the power transmission coil, the conductive member of the communication module is positioned to the substrate side in the coil axial direction than a coil end portion of the power transmission coil opposite side to the substrate.

According to another aspect of the present invention, in the power transmitting communication unit, it is preferable that the substrate contains a magnetic body, and an end portion on a communication side in the coil axial direction of the conductive member, when viewed from the orthogonal direction, is positioned between a surface on the power transmission coil side of the substrate and a position at which communication with a counterpart communication module is possible, in the coil axial direction.

According to still another aspect of the present invention, in the power transmitting communication unit, it is preferable that the substrate contains a magnetic body, and an end portion on a communication side in the coil axial direction of the conductive member, when viewed from the orthogonal direction, is positioned at a same position as a surface of the substrate opposite to the power transmission coil, in the coil axial direction.

According to still another aspect of the present invention, in the power transmitting communication unit, it is preferable that the power transmitting communication unit is arranged facing to a counterpart power transmitting communication unit in the coil axial direction; the counterpart power transmitting communication unit includes a counterpart substrate that has a counterpart opening, a counterpart power transmission coil that is spirally formed around the counterpart opening, is mounted on one surface of the counterpart substrate, is connected to a circuit of the counterpart substrate, and performs transmission of electric power in a non-contact manner, and a counterpart communication module that is installed at the counterpart opening, includes a counterpart conductive member, and performs wireless communication through the counterpart conductive member; a distance in the coil axial direction between the coil end portion and the counterpart coil end portion of the counterpart power transmission coil opposite side to the counterpart substrate in the counterpart power transmitting communication unit is 10 mm; and an end portion on a communication side in the coil axial direction of the conductive member, when viewed from the orthogonal direction, is positioned in a range from a position that is 2 mm away from the coil end portion toward the substrate to a position at which communication with the counterpart communication module is possible, in the coil axial direction.

According to still another aspect of the present invention, in the power transmitting communication unit, it is preferable that the communication module includes a printed circuit board, and the conductive member is connected to a circuit of the printed circuit board, is formed projecting from the printed circuit board, and includes a coupling electrode that accumulates electrical charges.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

With reference to the accompanying drawings, a form to implement the present invention (an embodiment) will be described in detail. The invention, however, is not limited by the content described in the following embodiment. Furthermore, the constituent elements described in the following include those that a person skilled in the art can easily assume or that are substantially the same. The configurations described in the following can be combined as appropriate. Moreover, various omissions, substitutions, or modifications of the configurations can be made without departing from the scope of the invention.

Embodiment

Figure 1:
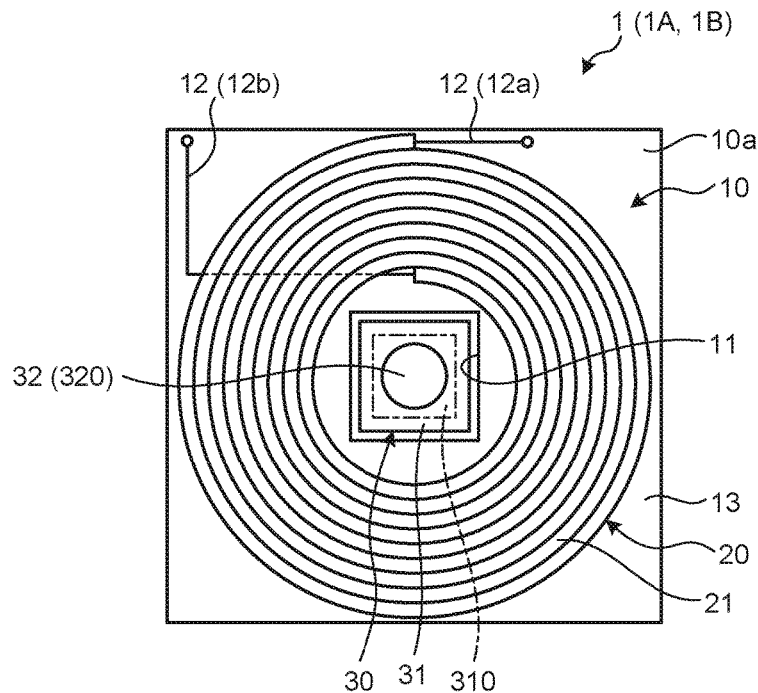
FIG. 1 is a bottom plan view illustrating an example of the configuration of a power transmitting communication unit according to an embodiment.
Figure 2:
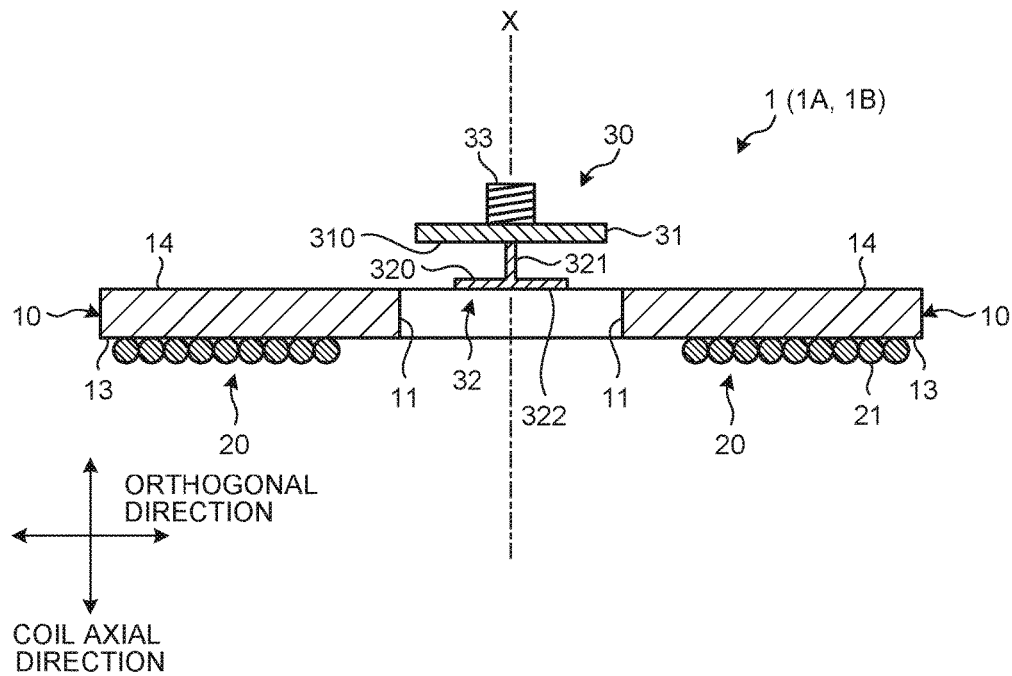
FIG. 2 is a sectional view illustrating an example of the configuration of the power transmitting communication unit in the embodiment.
Figure 3:
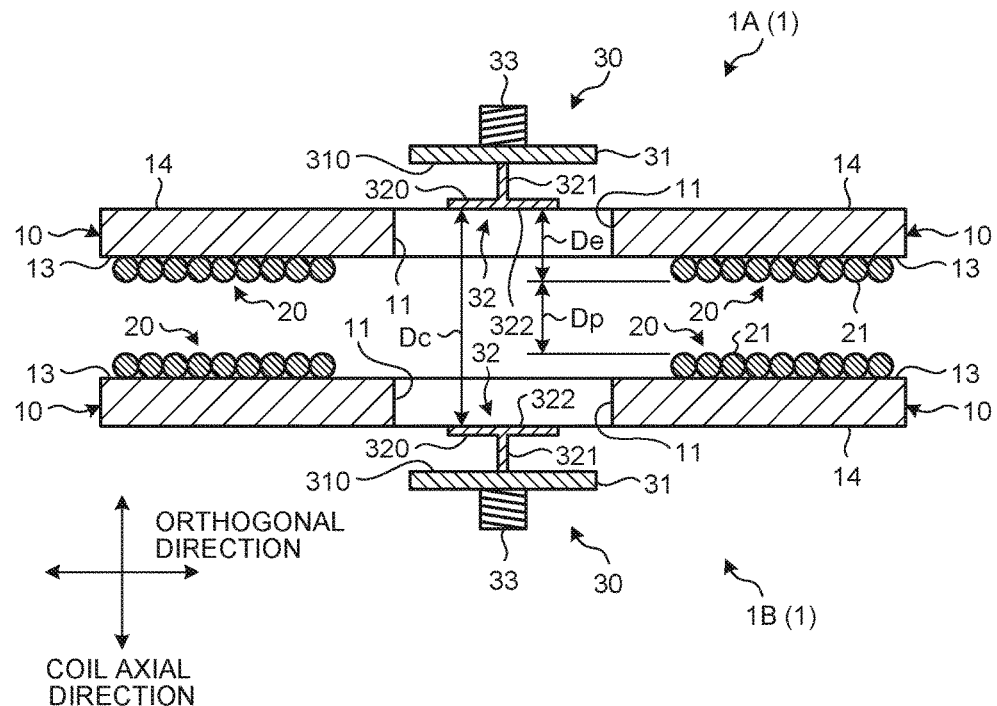
FIG. 3 is a sectional view illustrating a positional relation between the power transmitting communication unit on a power transmitting side and the power transmitting communication unit on a power receiving side in the embodiment.

A power transmitting communication unit according to an embodiment will be described. FIG. 1 is a bottom plan view illustrating an example of the configuration of the power transmitting communication unit in the embodiment. FIG. 2 is a sectional view illustrating an example of the configuration of the power transmitting communication unit in the embodiment. FIG. 3 is a sectional view illustrating a positional relation between the power transmitting communication unit on a power transmitting side and the power transmitting communication unit on a power receiving side in the embodiment.

A power transmitting communication unit 1 (1A) transmits electric power in a non-contact manner to a power transmitting communication unit 1 (1B) as a counterpart power transmitting communication unit and performs communication with the power transmitting communication unit 1 (1B) in a wireless manner. The power transmitting communication unit 1 includes, as illustrated in FIGS. 1 and 2, a substrate 10, a power transmission coil 20, and a communication coupler 30 that is a communication module. To facilitate the understanding of description, the power transmitting communication unit 1 is illustrated in a state of a housing being removed.

The substrate 10 includes an insulating material 10a, an opening 11, and a power transmitting circuit 12. The insulating material 10a is formed in a plate-like shape of rectangular parallelepiped and contains ferrite that is a magnetic body of high magnetic permeability. In the insulating material 10a, the opening 11 of a quadrate shape is formed in the middle. The opening 11 is opened in a size of not interfering with the communication of the communication coupler 30. On a surface 13 of the insulating material 10a on the power transmission coil 20 side, the power transmitting circuit 12 is formed.

The power transmission coil 20 performs transmission of electric power in a non-contact manner. The power transmission coil 20 is spirally formed around the opening 11 of the substrate 10 with a central axis line X as a center, and is mounted on the surface 13 of the substrate 10 on the power transmitting circuit 12 side. The power transmission coil 20 is connected to the circuit 12 formed on the substrate 10. For example, one end terminal of the power transmission coil 20 is connected to a circuit 12a and the other end terminal of the power transmission coil 20 is connected to a circuit 12b.

The communication coupler 30 is installed at the opening 11 of the substrate 10 and performs wireless communication with a counterpart communication coupler 30. The communication coupler 30 uses TransferJet (registered trademark) that is a close-proximity wireless transfer technology, for example. The communication coupler 30 includes a printed circuit board 31, a coupling electrode 32, and a coaxial connector 33. The coupling electrode 32 is included in a conductive member.

The printed circuit board 31 is formed in a plate-like shape of rectangular parallelepiped. On the printed circuit board 31, a circuit 310 is formed.

The coupling electrode 32 accumulates electrical charges used in communication. The coupling electrode 32 is connected to the circuit 310 of the printed circuit board 31 and is formed projecting from the printed circuit board 31. For example, the coupling electrode 32 includes a circular electrode plate 320, and an electrode 321 that extends in a coil axial direction of the electrode plate 320 from substantially the center of the circular electrode plate 320. The coil axial direction is a direction along the central axis line X. An end terminal of the electrode 321 opposite to the electrode plate 320 is connected to the circuit 310 of the printed circuit board 31. The electrode plate 320 is installed substantially in parallel with the surface on which the circuit 310 of the printed circuit board 31 is formed.

The coaxial connector 33 connects the circuit 310 of the printed circuit board 31 with a cable not illustrated.

The coupling electrode 32 of the communication coupler 30 is positioned to the substrate 10 side than power transmission coil 20 in order to suppress the influence received from the magnetic field of the power transmission coil 20. For example, the coupling electrode 32 of the communication coupler 30, when viewed from an orthogonal direction orthogonal to the coil axial direction of the power transmission coil 20, is positioned to the substrate 10 side in the coil axial direction than a coil end portion 21 of the power transmission coil 20 opposite side to the substrate 10. Preferably, when viewed from the orthogonal direction, an end portion 322 of the coupling electrode 32 on a communication side in the coil axial direction is positioned between the surface 13 of the substrate 10 on the power transmission coil 20 side and the position at which the communication with the counterpart communication coupler 30 is possible, in the coil axial direction. In the embodiment, when viewed from the orthogonal direction, the end portion 322 of the coupling electrode 32 on the communication side in the coil axial direction is positioned at the same position as a surface 14 of the substrate 10 opposite to the power transmission coil 20, in the coil axial direction.

In the power transmission coil 20, due to variance caused by errors in manufacturing, the wire diameter of the power transmission coil 20 may not be constant. Thus, in the coil end portion 21 of the power transmission coil 20, when viewed from the orthogonal direction, due to the difference in the wire diameter of the power transmission coil 20, irregularities in the coil axial direction may occur. Accordingly, when viewed from the orthogonal direction, the coil end portion 21 of the power transmission coil 20 indicates a portion that is furthest away from the substrate 10 in the coil axial direction.

The power transmitting communication unit 1A, as illustrated in FIG. 3, is arranged facing the power transmitting communication unit 1B in the coil axial direction. That is, the communication coupler 30 of the power transmitting communication unit 1A and the communication coupler 30 of the power transmitting communication unit 1B are arranged facing each other to be able to perform communication, and the power transmission coil 20 of the power transmitting communication unit 1A and the power transmission coil 20 of the power transmitting communication unit 1B are arranged facing each other to be able to perform electric power transmission. The power transmitting communication unit 1A and the power transmitting communication unit 1B are in substantially the same configuration, and depending on a use mode, function as a transmitting side transmitting an electrical signal or as a receiving side receiving an electrical signal. Furthermore, the power transmitting communication unit 1A and the power transmitting communication unit 1B function, depending on the use mode, as a power transmitting side transmitting electric power or as a power receiving side receiving the electric power. The power transmitting communication unit 1B includes the substrate 10 as a counterpart substrate, the opening 11 as a counterpart opening, the power transmission coil 20 as a counterpart power transmission coil, the coil end portion 21 as a counterpart coil end portion, the communication coupler 30 as a counterpart communication module, and the coupling electrode 32 as a counterpart conductive member.

One example of a geometrical arrangement of the power transmitting communication unit 1A and the power transmitting communication unit 1B will be described. A communication distance between the communication coupler 30 of the power transmitting communication unit 1A and the communication coupler 30 of the power transmitting communication unit 1B is a maximum of approximately 210 mm, for example. That is, a distance Dc between the end portion 322 of the coupling electrode 32 on the communication side in the coil axial direction of the power transmitting communication unit 1A and the end portion 322 of the coupling electrode 32 on the communication side in the coil axial direction of the power transmitting communication unit 1B is a maximum of approximately 210 mm, for example.

The coupling electrode 32, as in the foregoing, is being offset toward the substrate 10 in the coil axial direction from the coil end portion 21 of the power transmission coil 20 being opposite to the substrate 10. For example, an offset distance De between the coil end portion 21 of the power transmission coil 20 and the end portion 322 of the coupling electrode 32 on the communication side in the coil axial direction is approximately 10 mm.

Accordingly, because the communication distance between the communication couplers 30 is a maximum of approximately 210 mm, in a state that the power transmitting communication unit 1A and the power transmitting communication unit 1B are facing each other, a maximum distance Dp in the coil axial direction between the power transmitting communication unit 1A and the power transmitting communication unit 1B is approximately 190 mm. That is, the maximum distance Dp between the coil end portion 21 of the power transmission coil 20 of the power transmitting communication unit 1A and the coil end portion 21 of the power transmission coil 20 of the power transmitting communication unit 1B is approximately 190 mm. When the distance in the coil axial direction between the power transmitting communication unit 1A and the power transmitting communication unit 1B exceeds the maximum distance Dp (approximately 190 mm), the distance between the communication couplers 30 exceeds 210 mm and the communication of the communication couplers 30 is affected. For example, the communication speed of the communication coupler 30 may be decreased and an error in the communication of the communication couplers 30 may occur. When the distance in the coil axial direction between the power transmitting communication unit 1A and the power transmitting communication unit 1B is equal to or smaller than the maximum distance Dp (approximately 190 mm), the communication of the communication couplers 30 is not affected.

Next, an example of the operation of the power transmitting communication unit 1 will be described. The following is described assuming that the power transmitting communication unit 1A performs transmitting an electrical signal and receiving electric power and that the power transmitting communication unit 1B performs receiving the electrical signal and transmitting the electric power.

When an electrical signal is input from a cable connected to the coaxial connector 33, the communication coupler 30 of the power transmitting communication unit 1A accumulates electrical charges in the coupling electrode 32. In a state that the power transmitting communication unit 1A and the power transmitting communication unit 1B are facing each other with a distance of approximately 10 mm or smaller, the communication coupler 30 of the power transmitting communication unit 1A transmits, to the communication coupler 30 of the power transmitting communication unit 1B, the electrical charges accumulated in the coupling electrode 32 as an electrical signal. The communication coupler 30 of the power transmitting communication unit 1B receives the electrical signal transmitted from the communication coupler 30 of the power transmitting communication unit 1A and outputs the electrical signal through a cable connected to the coaxial connector 33.

An AC power source not illustrated of the power transmitting communication unit 1B supplies electric power to the power transmission coil 20 through the power transmitting circuit 12. When an electric current flows through the power transmission coil 20, a magnetic field is generated, and by an induced electromotive force induced by this magnetic field, an electric current flows through the power transmission coil 20 of the power transmitting communication unit 1A.

Figure 4:
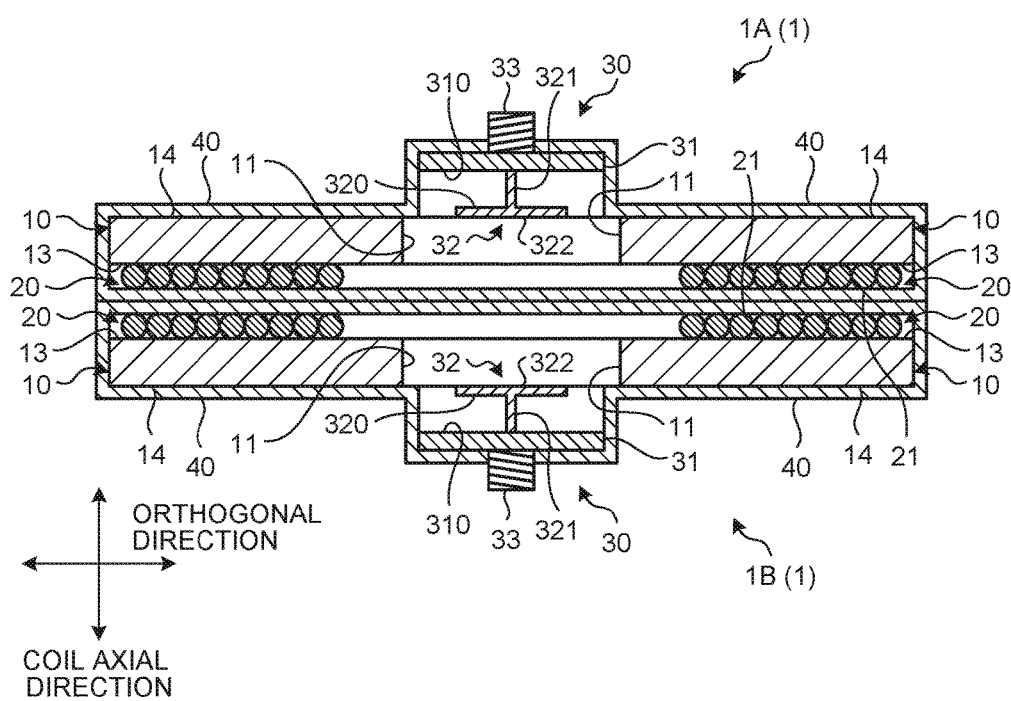
FIG. 4 is a sectional view illustrating a usage example (Part 1) of the power transmitting communication unit in the embodiment.
Figure 5:
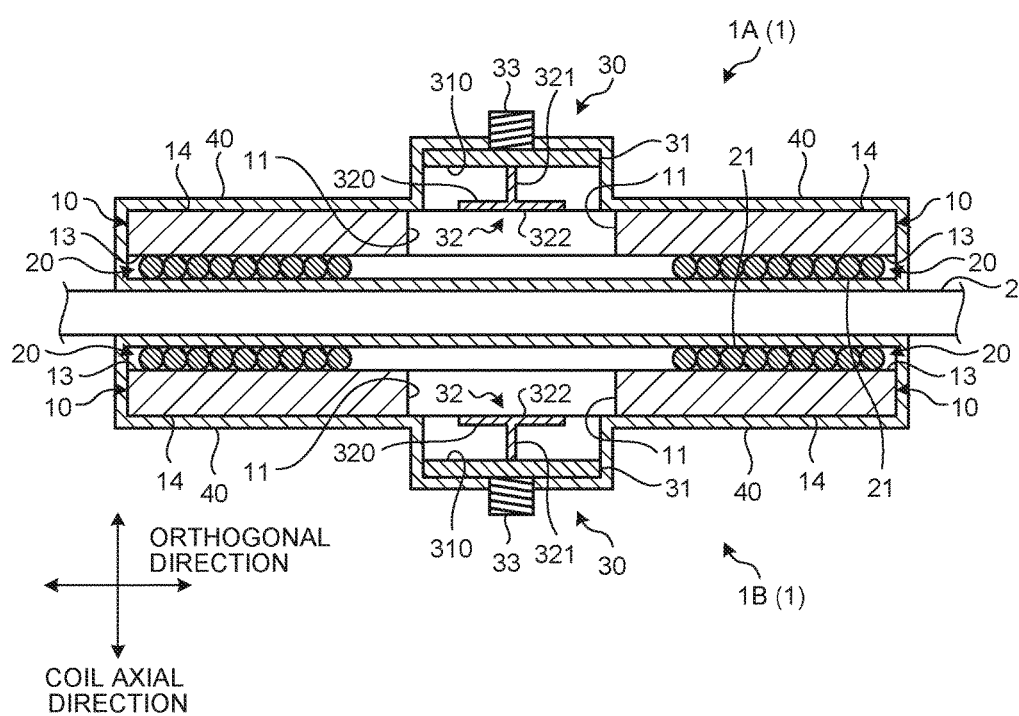
FIG. 5 is a sectional view illustrating a usage example (Part 2) of the power transmitting communication unit in the embodiment.

Next, a usage example of the power transmitting communication unit 1 will be described. FIG. 4 is a sectional view illustrating a usage example (Part 1) of the power transmitting communication unit in the embodiment. FIG. 5 is a sectional view illustrating a usage example (Part 2) of the power transmitting communication unit in the embodiment. The power transmitting communication units 1 illustrated in FIGS. 4 and 5 each have a housing 40 mounted thereon. The housing 40 is formed from, for example, resin, and protects the power transmission coil 20 and the communication coupler 30 mounted on the substrate 10.

As illustrated in FIG. 4, in a state that no obstacles are interposed between the power transmitting communication unit 1A and the power transmitting communication unit 1B, the power transmitting communication unit 1A and the power transmitting communication unit 1B may be communicably arranged facing each other in the coil axial direction. Then, the communication coupler 30 of the power transmitting communication unit 1A transmits an electrical signal to the communication coupler 30 of the power transmitting communication unit 1B. The communication coupler 30 of the power transmitting communication unit 1B receives the electrical signal transmitted from the communication coupler 30 of the power transmitting communication unit 1A. Furthermore, the power transmission 20 of the power transmitting communication unit 1B transmits electric power to the power transmission coil 20 of the power transmitting communication unit 1A by magnetic field coupling. The power transmission coil 20 of the power transmitting communication unit 1A receives the electric power transmitted from the power transmission coil 20 of the power transmitting communication unit 1B.

Furthermore, as illustrated in FIG. 5, in a state that an obstacle 2 that is a non-conductive member is interposed between the power transmitting communication unit 1A and the power transmitting communication unit 1B, the power transmitting communication unit 1A and the power transmitting communication unit 1B may be communicably arranged facing each other in the coil axial direction.

Figure 6:
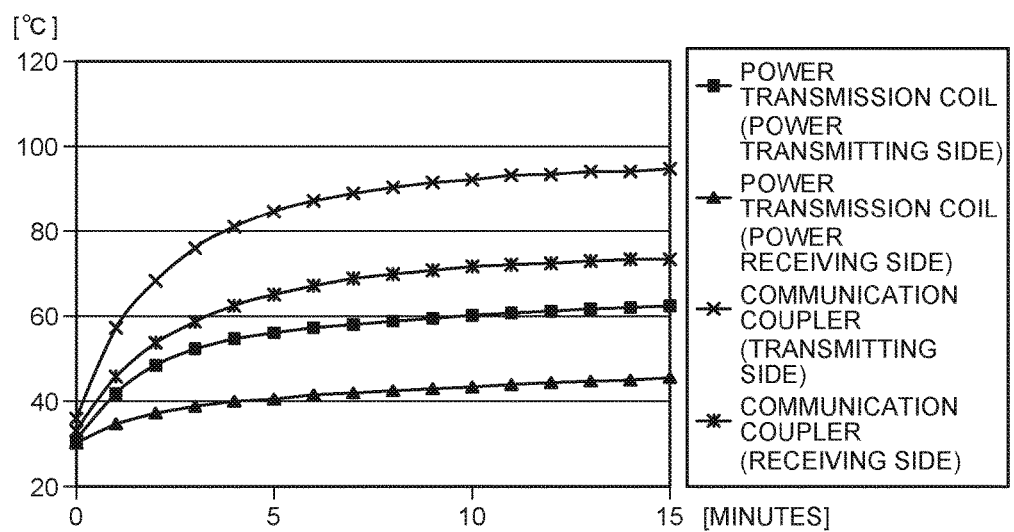
FIG. 6 is a graph illustrating an example of temperature rise (distance: 10 mm) according to a comparative example.
Figure 7:
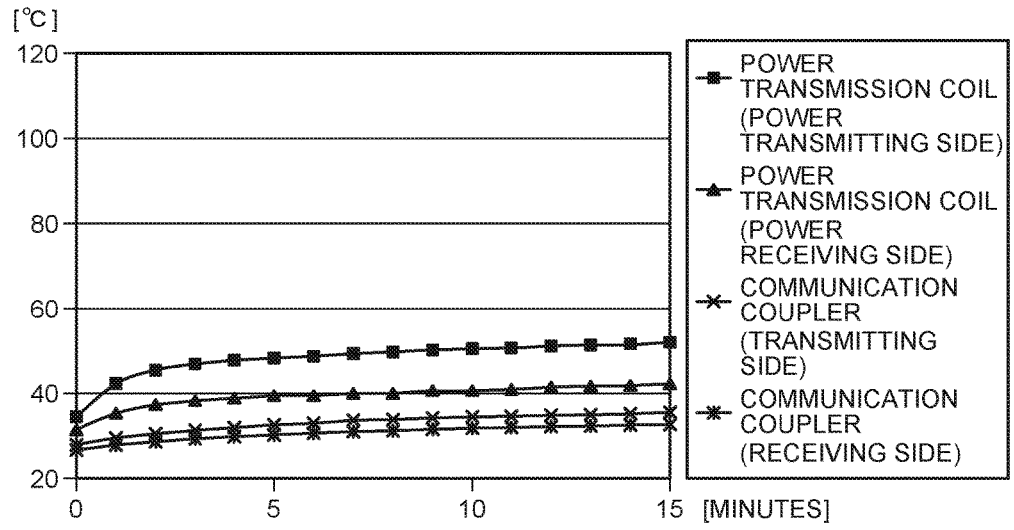
FIG. 7 is a graph illustrating an example of temperature rise (distance: 10 mm) in the embodiment.
Figure 8:
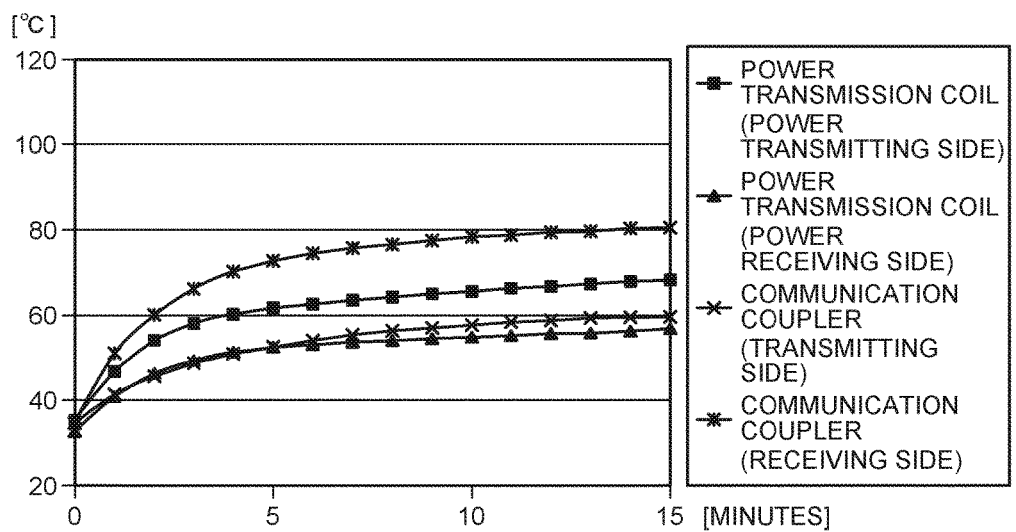
FIG. 8 is a graph illustrating an example of temperature rise (distance: 5 mm) in the comparative example.
Figure 9:
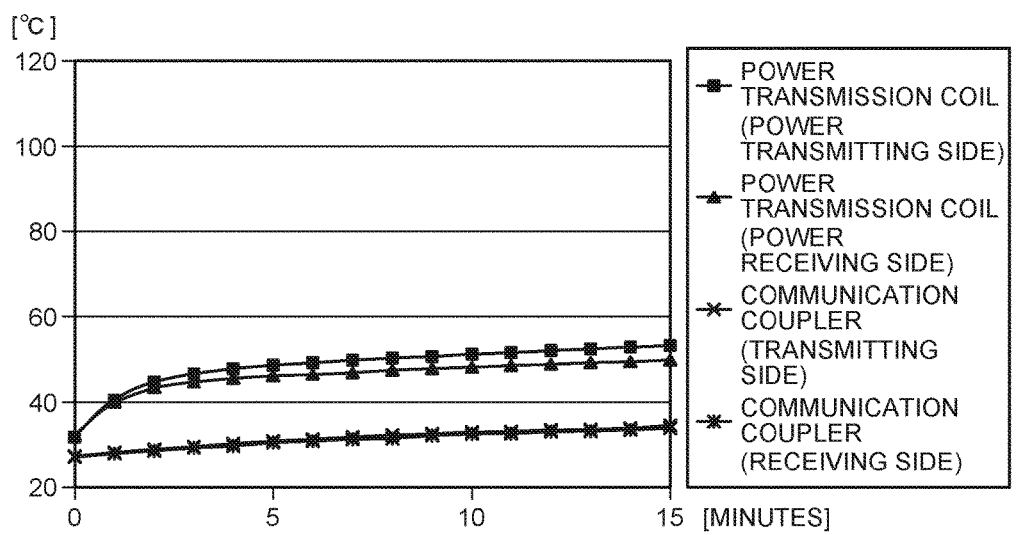
FIG. 9 is a graph illustrating an example of temperature rise (distance: 5 mm) in the embodiment.

Next, temperature changes in the communication coupler 30 and the power transmission coil 20 will be described while making comparisons with a comparative example. FIG. 6 is a graph illustrating an example of temperature rise (distance: 10 mm) according to the comparative example. FIG. 7 is a graph illustrating an example of temperature rise (distance: 10 mm) in the embodiment. FIG. 8 is a graph illustrating an example of temperature rise (distance: 5 mm) in the comparative example. FIG. 9 is a graph illustrating an example of temperature rise (distance: 5 mm) in the embodiment. In FIGS. 6 to 9, the vertical axis represents temperature and the horizontal axis represents time (minutes).

In the comparative example, a coupling electrode not illustrated is not being offset in the coil axial direction from an end portion of a power transmission coil not illustrated being opposite to a substrate. That is, when viewed from the orthogonal direction, the end portion of the power transmission coil opposite side to the substrate and the end portion of the coupling electrode on the communication side in the coil axial direction are juxtaposed in the coil axial direction. The distance in the coil axial direction between the power transmitting communication unit of the transmitting side in the comparative example not illustrated and the power transmitting communication unit of the receiving side in the comparative example not illustrated is approximately 10 mm. In this case, in the power transmitting communication unit in the comparative example, as illustrated in FIG. 6, at 15 minutes after starting the transmission of an electrical signal, the temperature of the communication coupler 30 of the transmitting side was 95° C. and the temperature of the communication coupler 30 of the receiving side was 73° C. Furthermore, at 15 minute after starting the transmission of electric power, the temperature of the power transmission coil 20 of the power transmitting side was 63° C. and the temperature of the power transmission coil 20 of the power receiving side was 46° C. The transmitting efficiency of electric power was 84%.

Meanwhile, in the power transmitting communication unit 1 in the present invention, in the case that the distance in the coil axial direction between the power transmitting communication unit 1A and the power transmitting communication unit 1B is approximately 10 mm, as illustrated in FIG. 7, at 15 minutes after starting the transmission of an electrical signal, the temperature of the communication coupler 30 of the transmitting side was 35° C. and the temperature of the communication coupler 30 of the receiving side was 33° C. Furthermore, at 15 minute after starting the transmission of electric power, the temperature of the power transmission coil 20 of the power transmitting side was 52° C. and the temperature of the power transmission coil 20 of the power receiving side was 42° C. The transmitting efficiency of electric power was 89%.

In the power transmitting communication unit 1 in the present invention, as compared with the power transmitting communication unit in the comparative example, the temperature of the communication coupler 30 of the transmitting side was reduced by 60° C. and the temperature of the communication coupler 30 of the receiving side was reduced by 40° C. Furthermore, in the power transmitting communication unit 1 in the present invention, as compared with the power transmitting communication unit in the comparative example, the temperature of the power transmission coil 20 of the power transmitting side was reduced by 11° C. and the temperature of the power transmission coil 20 of the power receiving side was reduced by 4° C. In the power transmitting communication unit 1 in the present invention, as compared with the power transmitting communication unit in the comparative example, the transmitting efficiency of electric power was improved by 5%.

In the case that the distance in the coil axial direction between the power transmitting communication unit of the transmitting side and the power transmitting communication unit of the receiving side in the comparative example is approximately 5 mm, as illustrated in FIG. 8, at 15 minutes after starting the transmission of an electrical signal, the temperature of the communication coupler 30 of the transmitting side was 59° C. and the temperature of the communication coupler 30 of the receiving side was 80° C. Furthermore, at 15 minute after starting the transmission of electric power, the temperature of the power transmission coil 20 of the power transmitting side was 68° C. and the temperature of the power transmission coil 20 of the power receiving side was 57° C. The transmitting efficiency of electric power was 84%.

Meanwhile, in the power transmitting communication unit 1 in the present invention, in the case that the distance in the coil axial direction between the power transmitting communication unit 1A and the power transmitting communication unit 1B is approximately 5 mm, as illustrated in FIG. 9, at 15 minutes after starting the transmission of an electrical signal, the temperature of the communication coupler 30 of the transmitting side was 34° C. and the temperature of the communication coupler 30 of the receiving side was 33° C. Furthermore, at 15 minute after starting the transmission of electric power, the temperature of the power transmission coil 20 of the power transmitting side was 53° C. and the temperature of the power transmission coil 20 of the power receiving side was 50° C. The transmitting efficiency of electric power was 88%.

In the power transmitting communication unit 1 in the present invention, as compared with the power transmitting communication unit in the comparative example, the temperature of the communication coupler 30 of the transmitting side was reduced by 25° C. and the temperature of the communication coupler 30 of the receiving side was reduced by 47° C. Furthermore, in the power transmitting communication unit 1 in the present invention, as compared with the power transmitting communication unit in the comparative example, the temperature of the power transmission coil 20 of the power transmitting side was reduced by 15° C. and the temperature of the power transmission coil 20 of the power receiving side was reduced by 7° C. In the power transmitting communication unit 1 in the present invention, as compared with the power transmitting communication unit in the comparative example, the transmitting efficiency of electric power was improved by 4%.

Figure 10:
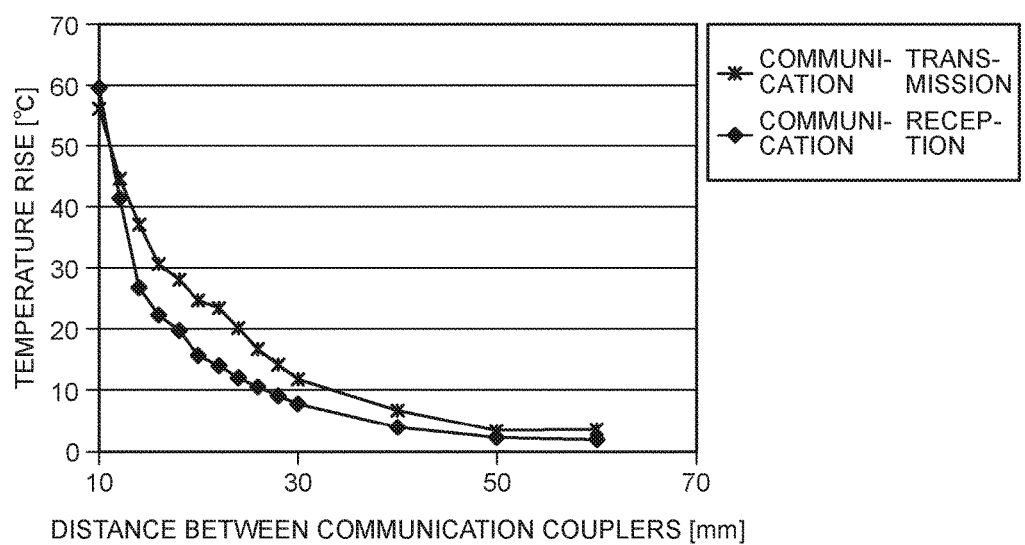
FIG. 10 is a graph illustrating an example of temperature rise in a communication coupler in the embodiment.

Next, an example of temperature rise in the communication coupler 30 in offsetting the communication coupler 30 will be described. FIG. 10 is a graph illustrating an example of temperature rise in the communication coupler in the embodiment. The vertical axis in FIG. 10 represents the temperature rise and the horizontal axis represents the communication distance between the communication coupler 30 of the power transmitting communication unit 1A and the communication coupler 30 of the power transmitting communication unit 1B. In this example, in the power transmitting communication units 1A and 1B, the temperature rise in the communication couplers 30 was measured when the offset distance De between the coil end portion 21 of the power transmission coil 20 opposite to the substrate 10 and the end portion 322 of the coupling electrode 32 on the communication side in the coil axial direction was changed from 1 mm to 25 mm. Furthermore, in the power transmitting communication units 1A and 1B, the distance in the coil axial direction between the coil end portion 21 of the power transmitting communication unit 1A and the coil end portion 21 of the power transmitting communication unit 1B was arranged to be 10 mm.

In the power transmitting communication units 1A and 1B, as illustrated in FIG. 10, it can be found that the temperature rise in the communication couplers 30 of the transmitting side and the receiving side is further suppressed as the communication distance of the communication couplers 30 becomes longer. In the power transmitting communication units 1A and 1B, when the communication distance of the communication couplers 30 is approximately 14 mm, that is, when each offset distance De is approximately 2 mm, the temperature rise of the communication couplers 30 was approximately 40° C. In the power transmitting communication units 1A and 1B, because it can be considered reasonable that the temperature of the communication coupler 30 in practical use is equal to or lower than approximately 40° C., it is preferable that the offset distance De of the communication coupler 30 be equal to or larger than approximately 2 mm. Furthermore, in the power transmitting communication units 1A and 1B, when the communication distance of the communication couplers 30 is approximately 50 mm, that is, when the offset distance De is approximately 20 mm, the temperature rise was the lowest. Then, in the power transmitting communication units 1A and 1B, when the communication distance of the communication couplers 30 exceeds approximately 50 mm, temperature changes in the communication couplers 30 were hardly observed. Thus, in the power transmitting communication units 1A and 1B, it is preferable that the offset distance De of the communication coupler 30 be equal to or smaller than approximately 20 mm. That is, in the power transmitting communication units 1A and 1B, when the distance Dp between the coil end portions 21 is 10 mm, it is preferable that the offset distance De of the communication coupler 30 be equal to or larger than approximately 2 mm, but be equal to or smaller than approximately 20 mm. Accordingly, the power transmitting communication units 1A and 1B can suppress the temperature rise of the communication coupler 30 and can be downsized. For example, in the power transmitting communication units 1A and 1B, when suppressing the temperature rise in the communication coupler 30 as much as possible is desired, it is preferable that the offset distance De be set to approximately 20 mm. When further downsizing is desired, it is preferable that the offset distance De be set to approximately 2 mm. In the power transmitting communication units 1A and 1B, the communication coupler 30 may be set to the position at which the offset distance De of the communication coupler 30 exceeds 20 mm but at which the communication coupler 30 can perform communication with the counterpart communication coupler 30, for example, at a position the offset distance De of which is approximately 100 mm. In this case, in the power transmitting communication units 1A and 1B, although the size is increased, the temperature rise is suppressed.

As in the foregoing, with the power transmitting communication unit 1 in the embodiment, the coupling electrode 32 of the communication coupler 30 is installed at the opening 11 and, when viewed from the orthogonal direction orthogonal to the coil axial direction of the power transmission coil 20, is positioned to the substrate 10 side in the coil axial direction than the coil end portion 21 of the power transmission coil 20 opposite side to the substrate 10.

Accordingly, the coupling electrode 32 of the communication coupler 30 can be kept at any position away from an area in which the magnetic field of the power transmission coil 20 is strong, that is, a central portion. Thus, as compared with a case that the communication coupler 30 and the power transmission coil 20 are installed on the same substrate, the influence of the magnetic field of the power transmission coil 20 that the coupling electrode 32 receives can be effectively suppressed. Consequently, because eddy currents that flow to the coupling electrode 32 can be suppressed, the temperature rise of the coupling electrode 32 can be suppressed. Furthermore, in the power transmission coil 20, because the influence from the magnetic field of the coupling electrode 32 can be suppressed, eddy currents that flow to the power transmission coil 20 can be suppressed and the temperature rise in the power transmission coil 20 can be suppressed. Moreover, in the power transmission coil 20, because the influence from the magnetic field of the coupling electrode 32 can be suppressed, the transmitting efficiency of electric power can be improved.

Preferably, when viewed from the orthogonal direction, the end portion 322 of the coupling electrode 32 on the communication side in the coil axial direction is positioned between the surface 13 on the power transmission coil 20 side of the substrate 10 and the position at which the communication with the counterpart communication coupler 30 is possible, in the coil axial direction.

Thus, because the coupling electrode 32 of the communication coupler 30 can be kept further away from the magnetic field of the power transmission coil 20, the influence of the magnetic field of the power transmission coil 20 that the coupling electrode 32 receives can be suppressed. Furthermore, because the magnetic flux of the power transmission coil 20 is absorbed into the substrate 10 that contains the magnetic body, the influence of the magnetic field of the power transmission coil 20 that the coupling electrode 32 receives can be suppressed.

Preferably, when viewed from the orthogonal direction, the end portion 322 of the coupling electrode 32 on the communication side in the coil axial direction is positioned at the same position as the surface 14 of the substrate 10 opposite to the power transmission coil 20, in the coil axial direction.

Thus, the coupling electrode 32 of the communication coupler 30 can be kept away from the magnetic field of the power transmission coil 20, and the communication coupler 30 can be arranged at a position at which the communication can be reliably performed.

Preferably, in the power transmitting communication units 1A and 1B, the distance in the coil axial direction between the coil end portion 21 of the power transmitting communication unit 1A and the coil end portion 21 of the power transmitting communication unit 1B is 10 mm and, when viewed from the orthogonal direction, the end portion 322 of the communication coupler 30 on the communication side in the coil axial direction is positioned in a range from the position that is 2 mm away from the coil end portion 21 toward the substrate 10 to the position at which communication with the counterpart communication coupler 30 is possible, in the coil axial direction.

Accordingly, the power transmitting communication units 1A and 1B can suppress the temperature rise of the communication couplers 30 within a range that the communication couplers 30 is practically available.

Because the power transmission coil 20 is being arranged spirally around the communication coupler 30, positions of the power transmitting communication unit 1A and the power transmitting communication unit 1B can be easily aligned. That is, the communication coupler 30 of the power transmitting communication unit 1A and the communication coupler 30 of the power transmitting communication unit 1B only need to be communicably arranged facing each other in the coil axial direction, and there is no need to perform the positioning in the direction of rotation with the coil axial direction as a central axis.

The end portion 322 of the coupling electrode 32 on the communication side in the coil axial direction, when viewed from the orthogonal direction, may be positioned between the surface 13 of the substrate 10 on the power transmission coil 20 side and the surface 14 of the substrate 10 opposite to the power transmission coil 20, in the coil axial direction. Moreover, the end portion 322 of the coupling electrode 32 on the communication side in the coil axial direction, when viewed from the orthogonal direction, may be positioned between the surface 14 of the substrate 10 opposite to the power transmission coil 20 and the position at which the communication with the counterpart communication coupler 30 is possible, in the coil axial direction.

Modification

Next, a modification of the embodiment will be described. The situation of using TransferJet (registered trademark) that is a close-proximity wireless transfer technology has been exemplified. However, other close-proximity wireless transfer technologies may be used.

The coupling electrode 32 that includes the circular electrode plate 320, and the electrode 321 that extends in the coil axial direction of the electrode plate 320 from substantially the center of the circular electrode plate 320 has been exemplified. However, the coupling electrode 32 may be in any shape as long as it allows wireless communication.

The conductive member of the communication coupler 30 that includes the coupling electrode 32 has been exemplified. However, the conductive member may further include the circuit 310 of the printed circuit board 31 in addition to the coupling electrode 32.

In the substrate 10, the insulating material 10a that includes ferrite that is a magnetic body is used. However, it may be an insulating material that contains no magnetic body. When the insulating material 10a contains a magnetic body, the magnetic body is not limited to ferrite.

With the power transmitting communication unit according to the present invention, because the conductive member of the communication module is installed at the opening of the substrate and is positioned to the substrate side in the coil axial direction than the end portion of the power transmission coil opposite side to the substrate, the temperature rise in the communication module can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmitting communication unit comprising:
a substrate that has an opening;
a power transmission coil that is spirally formed around the opening about a central axis, is mounted on one surface of the substrate, is connected to a circuit of the substrate, and performs transmission of electric power in a non-contact manner, the power transmission coil has a substrate side that faces toward the substrate and a power transmission coil opposite side that faces away from the substrate, and the power transmission coil includes a coil end portion on the power transmission coil opposite side; and
a communication module that is installed at the opening, includes a conductive member, and performs wireless communication through the conductive member, the conductive member includes a planar electrode plate and a rod-shaped electrode that is connected to and extends away from the electrode plate along the central axis in a coil axial direction, wherein
when viewed from an orthogonal direction orthogonal to the coil axial direction, the conductive member of the communication module is positioned closer to the substrate side in the coil axial direction than to the coil end portion of the power transmission coil opposite side;
wherein the substrate contains a magnetic body, and
the conductive member extends in the coil axial direction and includes a communication side and an end portion on communication side, and, when viewed from the orthogonal direction, the electrode plate of the end portion is coplanar with a surface of the substrate that is opposite to the one surface of the substrate.

2. The power transmitting communication unit according to claim 1, wherein
the substrate contains a magnetic body, and includes a coil side that faces the substrate side of the power transmission coil, and
the conductive member includes a communication side that faces toward a counterpart communication module when the counterpart communication module is in communication with the communication module, the communication side includes an end portion, when viewed from the orthogonal direction, the electrode plate of the end portion is positioned between a surface on the power transmission coil side of the substrate and a position at which communication with the counterpart communication module occurs, and the position is spaced away from the coil side of the substrate in the coil axial direction.

3. A power transmitting communication assembly comprising:
the power transmitting communication unit according to claim 1; and
a counterpart power transmitting communication unit facing to the power transmitting communication unit in the coil axial direction, the counterpart power transmitting communication unit includes
a counterpart substrate that has a counterpart opening,
a counterpart power transmission coil that is spirally formed around the counterpart opening, is mounted on one surface of the counterpart substrate, is connected to a circuit of the counterpart substrate, and performs transmission of electric power in a non-contact manner, the counterpart power transmission coil has a counterpart substrate side that faces toward the counterpart substrate and a counterpart power transmission coil opposite side that faces away from the counterpart substrate, and the counterpart power transmission coil includes a counterpart coil end portion on the counterpart power transmission coil opposite side, and a counterpart communication module that is installed at the counterpart opening, includes a counterpart conductive member, and performs wireless communication through the counterpart conductive member, wherein a distance in the coil axial direction between the coil end portion and the counterpart coil end portion of the counterpart power transmission coil opposite side to the counterpart substrate in the counterpart power transmitting communication unit is 10 mm, and the conductive member includes a communication side and an end portion on the communication side, and, when viewed from the orthogonal direction, the electrode plate of the end portion is positioned in a range from a first position to a second position, the first is 2 mm in the coil axial direction away from the coil end portion toward the substrate, the second position is a position at which communication with the counterpart communication module occurs, and the second position is spaced away from the first position in the coil axial direction.

4. The power transmitting communication unit according to claim 1, wherein the communication module includes a printed circuit board, and the conductive member is connected to a circuit of the printed circuit board, is formed projecting from the printed circuit board, and includes a coupling electrode that accumulates electrical charges.

* * * * *